Sept. 6, 1955     S. A. WILSON     2,717,081

EMULSION TREATER PRESSURE CONTROL

Filed Feb. 27, 1952     3 Sheets-Sheet 1

INVENTOR.
S. A. WILSON
BY
*C. M. McKnight*
ATTORNEY

Sept. 6, 1955  S. A. WILSON  2,717,081
EMULSION TREATER PRESSURE CONTROL
Filed Feb. 27, 1952  3 Sheets-Sheet 2

INVENTOR.
S. A. WILSON
BY
C. M. McKeight
ATTORNEY

Sept. 6, 1955　　　　　　S. A. WILSON　　　　　　2,717,081
EMULSION TREATER PRESSURE CONTROL
Filed Feb. 27, 1952　　　　　　　　　　　3 Sheets-Sheet 3

INVENTOR.
S. A. WILSON
BY
C. M. McKnight
ATTORNEY

United States Patent Office 2,717,081
Patented Sept. 6, 1955

2,717,081

EMULSION TREATER PRESSURE CONTROL

Samuel A. Wilson, Tulsa, Okla., assignor to Maloney-Crawford Tank and Manufacturing Company, Tulsa, Okla., a corporation of Delaware Application February 27, 1952, Serial No. 273,620

2 Claims. (Cl. 210—52.5)

This invention relates to improvements in emulsion treaters and more particularly, but not by way of limitation, to a method of and apparatus for treating crude oil emulsion containing a negligible amount of gas.

As it is well known in the oil industry, the crude oil produced from the majority of oil wells consists of a mixture of gas, water and oil. This mixture or emulsion is ordinarily directed through a treater immediately subsequent to its flow from the well where the gas, water and oil are separated. Subsequent to the separation of the constituent parts of the mixture in the treater, the oil is usually directed to storage tanks in the immediate vicinity of the treater. In the normal operation of the emulsion treater, the pressure of the gas contained in the emulsion is utilized to force the separated oil to the storage tanks.

During the producing life of a large portion of the oil wells, the gas content of the crude oil gradually decreases to a point where the gas content is negligible. When this condition is reached, it will be apparent that the emulsion treater cannot utilize the gas pressure for forcing the separated oil to storage, particularly when the storage tanks are disposed at a higher level than the emulsion treater.

The present invention contemplates a novel method of separating the constituent parts of a crude oil emulsion when the gas content is low in such a manner to utilize the fluid pressure obtained by the oil well pumping apparatus to force the separated oil from the emulsion treater to a storage tank or the like. The emulsion treater is so constructed and arranged to provide closed chambers for the emulsion whereby the pressure of the emulsion is retained throughout its flow through the treater. The usual gas conduits and gas outlet of the treater are plugged to preclude the emulsion from bypassing the separating trays of the treater, as well as to retain the pressure of the oil throughout its flow through the treater. It is also contemplated to provide such a method wherein the separated water may be forced through a filter or the like for low pressure water flooding of the oil producing formation by the fluid pressure developed by the well pumping apparatus. It will be apparent from the discussion hereinafter that my novel method may be practiced with the use of either a horizontal or vertical emulsion treater.

An important object of this invention is to provide a novel method of treating crude oil emulsions.

Another object of this invention is to provide a novel method of treating crude oil emulsions where the gas content of the crude is negligible.

Another object of this invention is to provide a novel treater for treating crude oil emulsions having a low gas content.

A further object of this invention is to provide a novel method of treating crude oil emulsions wherein the separated water may be used for low pressure water flooding.

A still further object of this invention is to provide a method of treating crude oil wherein the fluid pressure developed by the bottom hole oil well pumping device is utilized to force the separated oil to storage.

Other objects and advantages of the invention will be evident from the following detailed description, read in conjunction with the accompanying drawings, will illustrate my invention.

Figure 2:
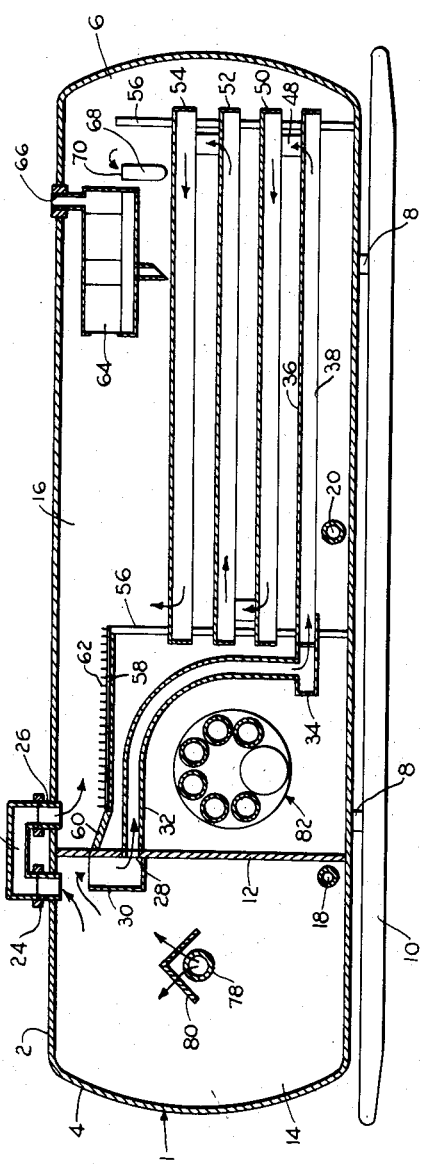
Figure 2 is a vertical sectional view of the treater shown in Fig. 1.
Figure 1:
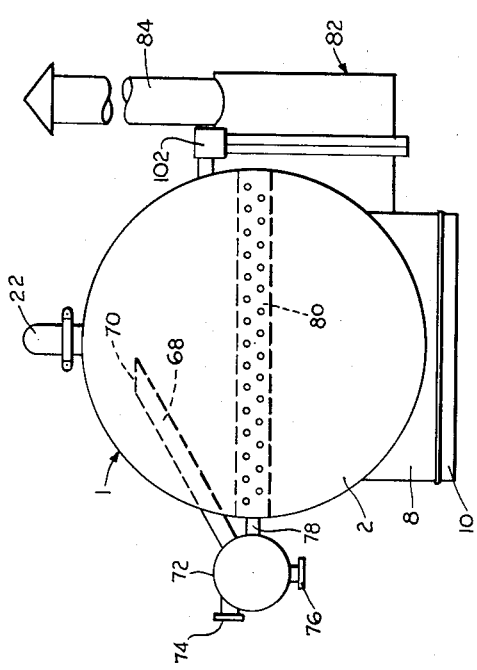
Figure 1 is an end elevational view of a horizontal emulsion treater.

Referring to the drawings in detail, and particularly Figs. 1 and 2, reference character 1 generally designates a horizontal treater comprising a shell 2 closed at its opposite ends 4 and 6 and having the usual manholes (not shown) for inspection purposes. The shell 2 is supported by suitable braces 8 on a skid or the like 10. A partition 12 extends transversely in the shell 2 to divide the shell into two chambers 14 and 16. The chamber 14 may be designated as the knockout chamber and the chamber 16 may be designated as the separating chamber. Water outlets 18 and 20 are provided in the lower portion of the chambers 14 and 16 respectively to withdraw the separated water, as will more fully hereinafter appear.

Figure 3:
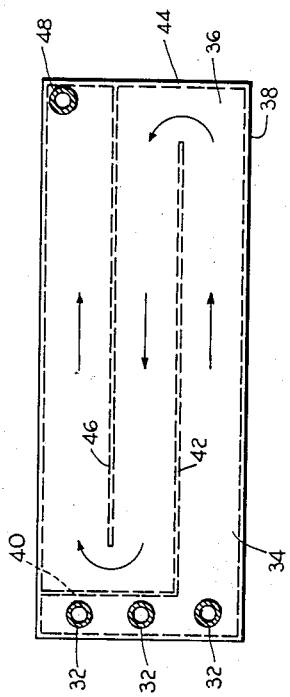
Figure 3 is a plan view of the bottom separating tray utilized in the treater shown in Figs. 1 and 2.

Communication between the upper portions of the chambers 14 and 16 is provided by an inverted U-shaped conduit 22 interconnected to the spaced nozzles 24 and 26 located in the shell 2 on opposite sides of the partition 12. The conduit 22 is utilized to direct the flow of gas from the knockout chamber 14 to the separating chamber 16 when the emulsion being treated contains an appreciable amount of gas, as will be more fully hereinafter set forth. Communication between the chambers 14 and 16 is also provided by a plurality of apertures 28 (preferably 3, but not limited thereto) located in the upper portion of the partition 12. A weir box 30 is secured in any suitable manner to the partition 12 in the knockout chamber 14 over the apertures 28 to control the flow of water-oil emulsion from the chamber 14. A conduit 32 is secured around each of the apertures 28 and extends into the chamber 16. The conduits 32 are curved downwardly and are connected at their lower ends to a tray member 34 (shown in detail in Fig. 3).

The tray 34 resembles an inverted pan having a closed top 36 and depending sides 38. A transverse baffle 40 is provided in the tray 34 adjacent the lower ends of the conduits 32 and extends only partially across the tray 34. A longitudinally extending baffle 42 is connected to the inner end of the transverse baffle 40 and extends into proximity with the end 44 of the tray 34. A second longitudinally disposed baffle 46 is secured in the tray 34 in parallel relationship with the baffle 42. The baffle 46 extends from the end 44 of the tray 34 to a point in proximity with the transverse baffle 40. A conduit 48 is secured to the tray 34 adjacent the end 44 thereof between the baffle 46 and the adjacent side of the tray 34 and extends upwardly to a similar tray 50. Similarly constructed trays 52 and 54 are disposed in spaced relation above the tray 50 and are interconnected in a similar manner to provide an elongated travel for the oil emulsion as will be hereinafter set forth. The trays 34, 50, 52 and 54 are supported in the shell 2 by suitable braces 56 in any suitable manner and are constructed and supported in substantially the same manner as the separating trays in applicant's co-pending application entitled "Horizontal Emulsion Treater," Serial Number 45,589, filed August 23, 1948; now abandoned.

The innermost supporting brace 56 also supports one end of a horizontally disposed perforated tray 58. The tray 58 is supported at its opposite end by the partition 12 through the medium of an angularly disposed brace 60. A series of baffles 62 are provided on the upper face of the horizontal tray 58. The tray 58 is constructed in the same manner as the complementary tray shown and described in the above co-pending application. A suitable mist extractor 64 is provided in the upper portion of the shell 2 adjacent the end 6 thereof and communicates with a gas outlet nozzle 66. The mist extractor 64 may be constructed in any suitable manner, such as in the above mentioned copending application, therefore, it is not shown in detail herein.

An oil outlet pipe 68 extends diagonally into the separating chamber 16 and terminates approximately half way between the upper tray 54 and the top of the shell 2. The inner end 70 of the pipe 68 is open to receive separated oil from the chamber 16. The outer end of the pipe 68 communicates with one end of the shell side of a heat exchanger 72 suitably mounted on one side of the shell 2 by braces or the like (not shown). The opposite end of the heat exchanger 72 is provided with an outlet nozzle 74 adapted to be interconnected to a conduit for directing the separated oil to storage as will be hereinafter set forth. The tube side of the heat exchanger 72 is provided with an inlet nozzle 76 to receive the emulsion from an oil well (not shown). The emulsion is directed through the heat exchanger 72 and is discharged therefrom through a conduit 78 which extends into and communicates with the knockout chamber 14. A perforated V-shaped baffle plate 80 is mounted transversely in the knockout chamber 14 in an inverted position above the inlet conduit 78 for purposes as will be hereinafter set forth.

A suitable furnace generally indicated at 82 and having the usual stack 84 extends transversely into the separating chamber 16 underneath the curved conduits 32 to heat the fluid flowing through the chamber 16 and facilitate the separation of the constituent elements of the fluid in a well known manner.

Figure 4:
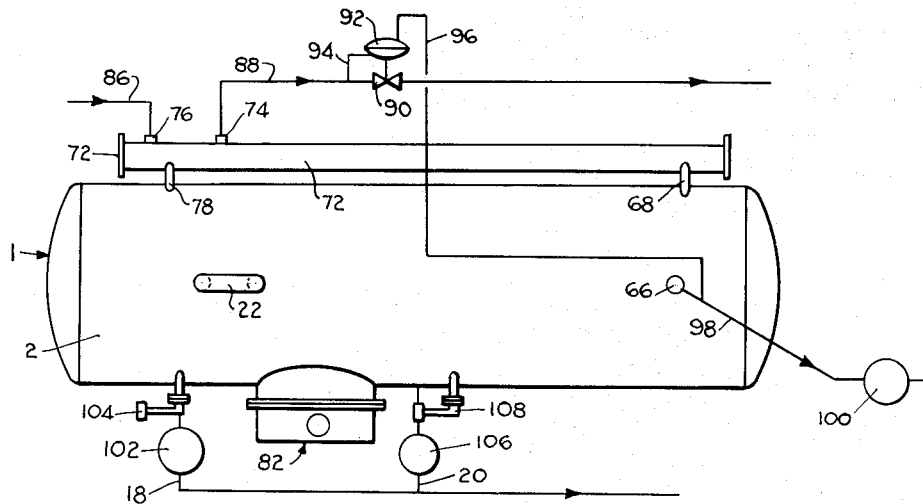
Figure 4 is a diagrammatic plan view of the treater shown in Figs. 1 and 2 illustrating the piping arrangement when the treater is utilized for separating a gas-water-oil emulsion.

The piping arrangement for the treater 1, when the emulsion being treated contains gas, water and oil, is illustrated in the diagrammatic view Fig. 4. A conduit 86 provides communication between the inlet nozzle 76 of the heat exchanger 72 and the oil producing well. A second conduit 88 provides communication between the outlet nozzle 74 of the heat exchanger 72 and a storage tank or the like (not shown) utilized for storing the separated oil. A diaphragm type valve 90 is interposed in the conduit 88 to regulate the flow of the separated oil to storage. The pressure of the fluid in the conduit 88 upstream of the valve 90 is imposed on the lower side of the diaphragm casing 92 through a small pressure conduit 94 in the usual manner. The pressure of the fluid in the conduit 88 is thus exerted through the conduit 94 to open the valve 90 and permit flow of fluid therethrough. A second pressure conduit 96 is connected at one end to the upper side of the diaphragm casing 92 and at its opposite end to a gas conduit 98 which communicates with the gas outlet 66. A suitable back pressure valve 100 is interposed in the conduit 98 downstream of the interconnection with the pressure conduit 96 to retain a predetermined gas pressure in the separating chamber 16. The pressure conduit 96 thus provides a constant application of the treater gas pressure on the upper side of the diaphragm (not shown) provided in the diaphragm casing 92 which, with the usual spring pressure of the valve 90, tends to retain the valve 90 in a closed position.

The water outlet conduit 18 communicating with the lower portion of the knockout chamber 14 is interconnected to the water outlet 20 which communicates with the lower portion of the separating chamber 16 to provide a common outlet for the water from the shell 2. A suitable motor valve 102 is interposed in the water conduit 18 adjacent the shell 2. The operation of the valve 102 is controlled by a suitable liquid level controller 104 mounted on the side of the shell 2 and communicating with the knockout chamber 14 in the usual manner. The liquid level controller 104 controls the interfacial level between the separated water and the emulsion in the knockout chamber 14 by operation of the motor 102, as is well known in the art. A motor valve 106 is also interposed in the conduit 20 to control the discharge of separated water from the separating chamber 16. A second liquid level controller 108, mounted on the side of the shell 2 and communicating with the separating chamber 16, controls the operation of the motor valve 106.

Operation

Assuming the emulsion desired to be separated consists of a mixture of gas, water and oil, the internal structure of the treater 1 will be as illustrated in Fig. 2 and the piping arrangement will be as illustrated in Fig. 4. The emulsion flowing through the conduit 86 is directed through the heat exchanger 72 and is discharged therefrom through the conduit 78 into the knockout chamber 14. The free water contained in the emulsion will immediately flow to the lower portion of the knockout chamber 14 by reason of its greater gravity, and the remainder of the emulsion will be directed upwardly through the perforated baffle plate 80 into the upper portion of the knockout chamber 14. The baffle plate 80 facilitates the separation of gas from the emulsion and also tends to break up the water and oil globules.

The separated gas, which may contain a small amount of heavier hydrocarbons, will be directed upwardly in the knockout chamber 14 through the nozzle 24 by reason of its lighter weight. The conduit 22 directs the separated gas from the nozzle 24 through the nozzle 26 into the upper portion of the separating chamber 16. The gas will then tend to flow over the baffle plate 58 where the baffles 62 will further tend to separate the heavier hydrocarbons from the gas. The gas then continues to flow along the upper portion of the chamber 16 into the mist extractor 64 where a further separating action is obtained. After the remaining heavy hydrocarbons are removed from the gas in the mist extractor 64, the separated gas is discharged through the outlet nozzle 66 and gas conduit 98. The back pressure valve 100 will maintain the gas in the shell 2 under pressure for purposes as will be hereinafter set forth. Furthermore, the pressure conduit 96 will cause an exertion of the gas pressure on the upper side of the diaphragm casing 92 and tend to retain the valve 90 in a closed position as heretofore set forth.

The oil emulsion contained in the knockout chamber 14 will be lighter than the free water, hence it will tend to rise above the free water into the upper portion of the chamber 14. When the emulsion has reached a predetermined level, it will flow into the weir box 30 where it will be directed downwardly through the conduits 32 into the lower tray 34. As the emulsion is forced through the tray 34, it is directed through a tortuous path as indicated by the arrows in Fig. 3 to break up and further separate the oil and water globules. The emulsion is then discharged from the tray 34 through the conduit 48 upwardly into the tray 50. The flow of the emulsion through the trays 50, 52 and 54 is similar to the flow thereof through the lower tray 34 to further separate the oil and water globules. It will be apparent that the separating chamber 16 contains water and oil strata with the oil disposed above the water by reason of its lower gravity. The separated water extends to a level slightly above the upper tray 54, therefore the oil will be retained in the trays 34—54 during its flow therethrough. The separated oil is discharged from the upper tray 54 as indicated by the arrow into a layer of separated oil present in the upper portion of the chamber 16 between the separated water there-below and the separated gas there-above.

The separated oil enters the open end 70 of the conduit 68 and is then directed downwardly into the heat exchanger 72. It will be apparent that the pressure of the gas, which is regulated by the back pressure valve 100, exerts a force on the separated oil to force the oil through the conduit 68, heat exchanger 72 and conduit 88. The back pressure valve 100 is set in such a manner that the pressure of the gas retained in the shell 2 will be sufficient to force the separated oil through the conduit 88 to storage. When the pressure of the oil is raised to a point where it slightly exceeds the pressure of the gas, the pressure exerted through the pressure conduit 94 on the lower side of the diaphragm casing 92 will open the valve 90 and permit flow of the oil to storage.

Figure 5:
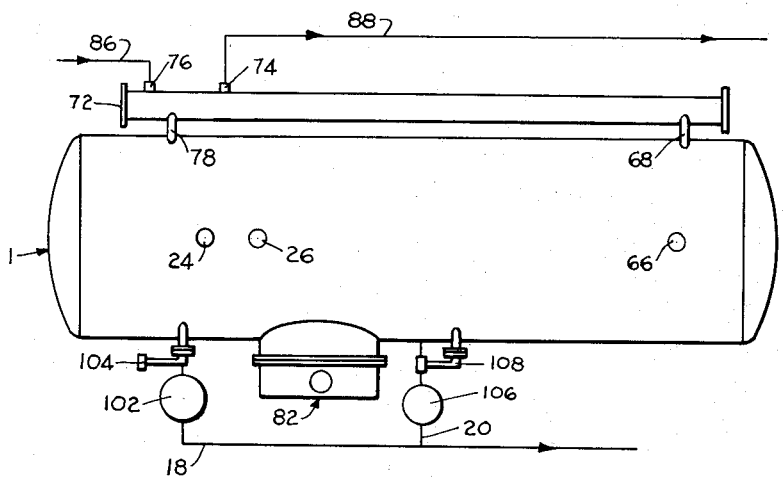
Figure 5 is a view similar to Fig. 4 illustrating the piping arrangement when the treater is utilized for separating emulsions containing a negligible amount of gas.

Thus, when the emulsion flowing through the treater 1 contains an appreciable amount of gas, the gas may be used as a pressure medium to force the separated oil to storage. It will be apparent, however, that when the gas content of the emulsion is reduced, the emulsion would tend to flow from the knockout chamber 14 through the conduit 22 and thereby bypass the separating trays 34, 50, 52 and 54. Furthermore, a portion of the emulsion would flow through the gas outlet 66 to render the treater 1 useless. In addition, no pressure would be provided to force the oil to storage. To preclude such a condition, I contemplate altering the structure of the treater 1 and arranging the piping as illustrated in Fig. 5.

The treater 1 is first altered by removing the U-shaped conduit 22 and plugging the nozzles 24 and 26. In this manner, the emulsion will be forced to flow from the knockout chamber 14 through the weir box 30 and conduits 32. The treater 1 is further altered by removing the gas outlet conduit 98 and plugging the gas outlet nozzle 66. Thus, fluid in the chamber 16 is forced to flow either through the oil outlet conduit 68 or the water outlet 20. In addition, the diaphragm valve 90 is either removed from the oil conduit 88 as illustrated in Fig. 5 or is rendered inoperable and retained in an open position at all times. The remaining structure of the treater 1, including the piping, is unaltered.

The flow of the water and oil emulsion from a producing well then will be as follows: The emulsion is directed from the conduit 86 through the heat exchanger 72 and the inlet conduit 78 into the knockout chamber 14. The free water will flow to the lower portion of the knockout chamber 14 in the usual manner and the water and oil globules will rise to the upper portion of the chamber 14. When the level of the emulsion consisting of oil and water globules is raised to a sufficient extent, the emulsion will flow over the weir box 30 and through the conduits 32 into the trays 34, 50, 52 and 54. The flow of the emulsion through the inverted trays 34, 50, 52 and 54 will be the same as heretofore set forth to provide an efficient separation of the oil and water globules. The separated oil is discharged from the upper tray 54 into the separated oil strata existing in the upper portion of the chamber 16. The separated oil is then discharged through the conduit 68, heat exchanger 72 and conduit 88.

From the foregoing, it will be apparent that the chambers 14 and 16 are closed to retain the initial pressure of the emulsion throughout its flow through the treater 1. The operation of the motor valves 102 and 106 is controlled only by the interfacial level of the water and oil in the chambers 14 and 16 and is unaffected by the pressure of the fluid as it flows through the shell 2. Thus, the only outlet from the knockout chamber 14, which is responsive to the pressure condition, is the apertures 28 communicating with the chamber 16. In addition, the only outlet from the chamber 16, which is responsive to the pressure therein, is the oil outlet conduit 68 communicating directly with the conduit 88. Thus, the pressure of the emulsion in the conduit 86, which is caused by the action of the oil well pumping apparatus (not shown), is retained to force the separated oil through the conduit 88 to storage. The small amount of gas which may be contained in the emulsion will be directed with the separated oil through the conduit 88 to storage.

Figure 6:
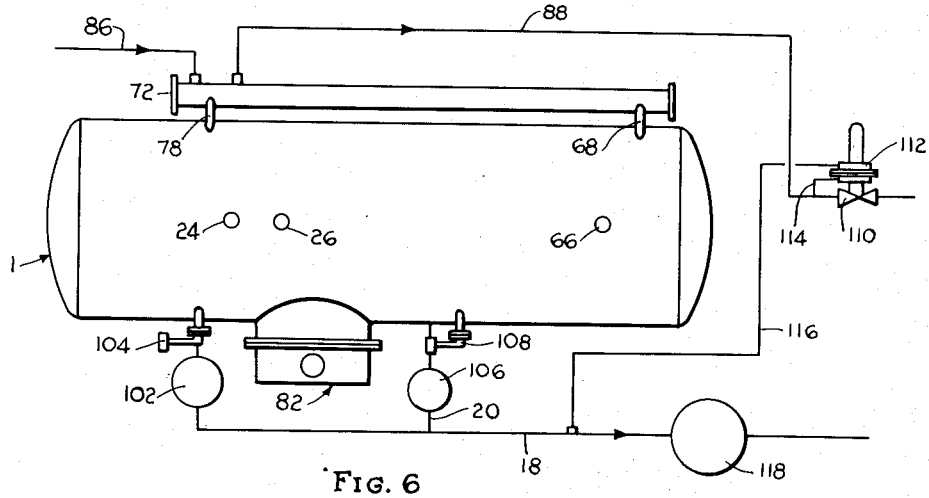
Figure 6 is a view similar to Figs. 4 and 5 illustrating the piping arrangement where the separated water may be utilized for low pressure water flooding.

The piping arrangement may be further altered as illustrated in Fig. 6 in the event it is desired to use the separated water for low pressure formation flooding or the like. To accomplish this result, I contemplate interposing a diaphragm type valve 110 in the oil outlet conduit 88. The lower portion of the diaphragm casing 112 is interconnected by a pressure conduit 114 to the oil outlet conduit 88, thus the pressure of the separated oil is constantly exerted on the lower side of the valve diaphragm tending to open the valve 110. The upper side of the diaphragm casing 112 is interconnected by a pressure line 116 to the water outlet line 18 downstream of its connection with the water outlet line 20. Thus, the pressure of the water outlet conduit 18 is constantly maintained on the top side of the diaphragm tending to close the valve 110. In addition, the spring pressure exerted on the upper side of the diaphragm also constantly urges the valve 110 in a closed position in the usual manner. When the separated water is used for flooding purposes, the water is intially passed through a filter 118. Usually the filter 118 requires a certain amount of pressure for forcing the separated water therethrough. Thus, the pressure of the separated water flowing through the outlet conduit 18 must be maintained at a specified pressure to operate the filter 118. It is also to be noted that an inherent pressure drop occurs during the flow of the separated water through the motor valves 102 and 106.

The operation of the treater 1, with the piping arrangement illustrated in Fig. 6, is in the usual manner wherein the separated oil is forced through the conduit 88 and the separated water is directed through the conduits 18 and 20. The pressure of the separated water in the conduit 18 is exerted through the pressure conduit 116 on the upper side of the diaphragm of the valve 110 to cooperate with the spring pressure in retaining the valve 110 in a closed position. Simultaneously, the pressure of the oil in the conduit 88 (which is substantially equal to the pressure in the treater 1) is exerted through the pressure line 114 to the lower side of said diaphragm. The spring pressure in the diaphragm casing 112 is set to approximately equal the pressure drop across the motor valves 102 and 106. It will therefore be apparent that the pressure in the treater 1 must be increased to where it is equal to the pressure necessary for the operation of the filter 118, plus the spring pressure acting on the diaphragm 112. When the treater pressure equals or slightly exceeds this pressure, the valve 110 is opened to permit further flow of the separated oil through the conduit 88. In addition, the pressure of the separated water in the outlet conduit 18 will necessarily be sufficient for the operation of the filter 118. Thus, the separated water will be forced through the filter 118 and be available for low pressure flooding purposes or the like.

Figure 7:
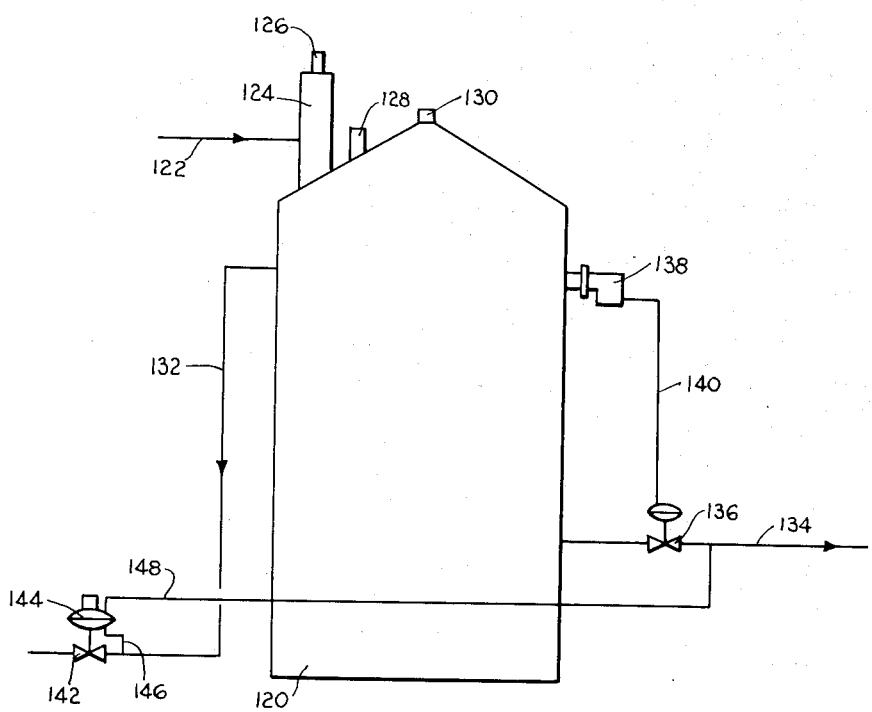
Figure 7 is a diagrammatic elevational view of a vertical treater illustrating the adaptation of the treater and the piping arrangement when the treater is utilized for separating emulsions having a low gas content.

It will be apparent to those skilled in the art that the present method of separating a water and oil emulsion may be practiced when utilizing a vertical treater, as well as when using a horizontal treater as heretofore explained. The diagrammatic view Fig. 7 illustrates a vertical treater 120 having the usual emulsion inlet 122 communicating with a producing well (not shown). The emulsion is directed into a knockout chamber 124 in the usual manner for the separation of the free water. Ordinarily, and when the emulsion contains an appreciable amount of gas, the gas is directed upwardly through a nozzle 126 and is then transferred to a nozzle 128 into the separating chamber. However, in practicing the present method, the nozzles 126 and 128 are plugged to control the flow of the oil and water globules from the knockout chamber 124 in a manner similar to that previously set forth for horizontal treaters. In addition, the usual gas outlet nozzle 130 provided at the top of the treater 120 is plugged. The separated oil is discharged through an outlet conduit 132 to suitable storage tanks or the like (not shown). The separated water is discharged from the treater 120 through an outlet conduit 134 to a filter (not shown) for water flooding purposes or the like. A motor valve 136 is interposed in the water outlet conduit 134 to control the flow of fluid therethrough in the usual manner. The operation of the motor valve 136 is controlled by a suitable liquid level controller 138 through the medium of a pressure line 140, as is well known in the art.

A diaphragm valve 142 is interposed in the oil outlet conduit 132 to control the flow of fluid therethrough. The lower side of the diaphragm casing 144 is connected by a pressure line 146 to the oil conduit 132. The upper side of the casing 144 is connected by a pressure line 148 with the water outlet conduit 134 downstream of the valve 136. Therefore, the pressure of the fluid in the oil outlet conduit 132, and hence the pressure in the treater 120, must exceed the pressure in the water outlet conduit 134, plus the spring pressure in the diaphragm casing 144, to open the valve 142. Thus, the pressure of the water flowing through the conduit 134 may be maintained at a desired reading in the same manner as previously set forth during the operation of a horizontal treater.

From the foregoing, it is apparent that the present invention provides a novel method of treating crude oil emulsions and particularly where the gas content of the emulsion is negligible. It is also apparent that the present invention provides a novel method of treating crude oil containing a negligible amount of gas wherein the fluid pressure developed by the oil well pumping apparatus is utilized to force the separated oil to storage. Furthermore, the pressure in the treater may be maintained sufficiently high whereby the separated water can be used for low pressure water flooding purposes or the like.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An oil-water emulsion processing system, comprising a treater shell, a partition in the shell dividing the shell into a knockout chamber and a separating chamber, an emulsion inlet in the shell for directing the emulsion into the knockout chamber under pressure, whereby the free water is separated from the emulsion and gravitates to the lower portion of the knockout chamber, a single set of emulsion outlets in the partition providing discharge of the emulsion into the separating chamber, inverted trays in the separating chamber communicating with said emulsion outlets to guide the emulsion through the separating chamber in a tortuous path, whereby the emulsion is further separated, an outlet in the upper portion of the separating chamber for discharge of the separated oil therefrom, outlets in the lower portion of the shell to remove the separated water from the knockout and separating chambers, a pressurized water conduit communicating with said last mentioned outlets, means co-operating with said water conduit to control the flow of the separated water therethrough in accordance with the water level in the treater shell, an oil discharge line leading from the emulsion outlet, a spring loaded diaphragm valve interposed in said oil discharge line, conduit means providing imposition of the pressure of said water line on one side of the diaphragm of said valve, whereby said pressure tends to retain said valve in a closed position, and means imposing the pressure of said oil discharge line on the opposite side of the diaphragm of said valve, whereby the pressure in the treater must exceed the pressure of said water conduit to open said valve.

2. In a treating system for a hydrocarbon-water emulsion under pressure, comprising a treater, communicating conduits and trays in the treater providing a single flow path for the hydrocarbons therethrough whereby the hydrocarbons are separated from the water, an outlet in the treater for the hydrocarbons, an outlet in the treater for the separated water, a water conduit communicating with the water outlet and having a back pressure interposed thereon, a flow line communicating with the hydrocarbon outlet, a diaphragm valve interposed in the flow line, a pressure line for imposing the pressure of the water conduit on one side of the diaphragm of said valve, whereby said pressure tends to retain said valve in a closed position, and a pressure line for imposing the pressure in the treater on the opposite side of the diaphragm of said valve for opening the valve, whereby the pressure in the treater must exceed the back pressure on said water conduit to open said valve and provide discharge of hydrocarbons from the treater.

References Cited in the file of this patent

UNITED STATES PATENTS

| | | |
|---|---|---|
| Re. 20,277 | Gordon | Jan. 5, 1937 |
| 2,025,883 | Mobley | Dec. 31, 1935 |
| 2,048,158 | Goodwin | July 21, 1936 |
| 2,179,131 | Millard | Nov. 7, 1939 |
| 2,211,282 | McKeever | Aug. 13, 1940 |
| 2,342,950 | Lovelady et al. | Feb. 29, 1944 |
| 2,348,357 | Parks | May 9, 1944 |
| 2,568,309 | Werts | Sept. 18, 1951 |
| 2,601,904 | Erwin | July 1, 1952 |
| 2,609,099 | Griswold | Sept. 2, 1952 |